(12) United States Patent
Yoneyama

(10) Patent No.: US 6,278,544 B1
(45) Date of Patent: Aug. 21, 2001

(54) REAL-IMAGE ZOOM FINDER OPTICAL SYSTEM

(75) Inventor: Shuji Yoneyama, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/540,979

(22) Filed: Mar. 31, 2000

(30) Foreign Application Priority Data

Apr. 8, 1999 (JP) ................................. 11-101554

(51) Int. Cl.[7] .................................. G02B 23/00
(52) U.S. Cl. .................. 359/431; 359/422; 359/432; 359/676
(58) Field of Search .................. 359/362, 652, 359/421–423, 431–433, 676–682, 689, 691; 396/373–386

(56) References Cited

U.S. PATENT DOCUMENTS

| | | | |
|---|---|---|---|
| 5,132,838 | * 7/1992 | Ohshita | 359/432 |
| 5,182,672 | * 1/1993 | Mukai et al. | 359/652 |
| 5,225,927 | 7/1993 | Nozaki et al. | 359/355 |
| 5,309,278 | 5/1994 | Ito et al. | 359/432 |
| 5,410,430 | 4/1995 | Ito et al. | 359/422 |
| 5,434,636 | 7/1995 | Hasushita et al. | 396/378 |
| 5,442,481 | 8/1995 | Hasushita | 359/614 |
| 5,541,768 | 7/1996 | Ito et al. | 359/422 |
| 5,550,674 | 8/1996 | Abe et al. | 359/422 |
| 5,726,799 | 3/1998 | Abe et al. | 359/431 |
| 5,793,529 | 8/1998 | Abe et al. | 359/422 |

FOREIGN PATENT DOCUMENTS 3-4217    1/1991    (JP) .

* cited by examiner

*Primary Examiner*—Thong Nguyen
(74) *Attorney, Agent, or Firm*—Greenblum & Bernstein, P.L.C.

(57) ABSTRACT

A real-image zoom finder optical system in which the objective lens system, the condenser lens system, the erecting optical system and the eyepiece lens system are arranged in this order from the object. The objective lens system includes a negative lens group (O1) and a positive lens group (O2), in this order from the object, and these lens groups are moveable along the optical axis upon zooming. Further, the negative lens group (O1) includes a negative meniscus single lens element (O11) having a convex surface facing towards the object, and a meniscus single lens element (O12) having a convex surface facing towards the image, in this order from the object.

6 Claims, 12 Drawing Sheets

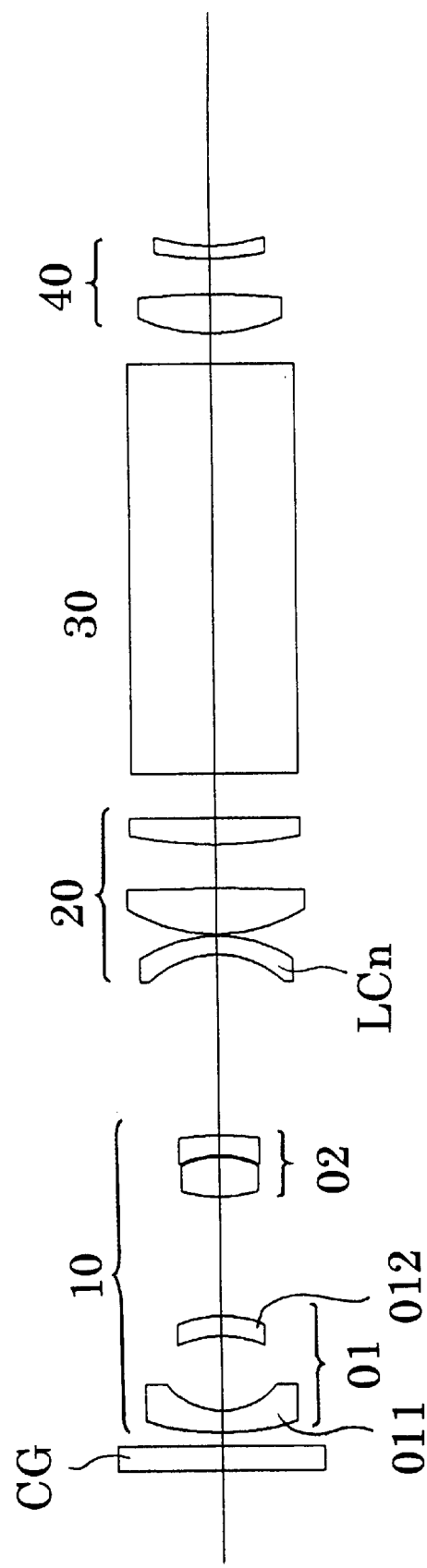

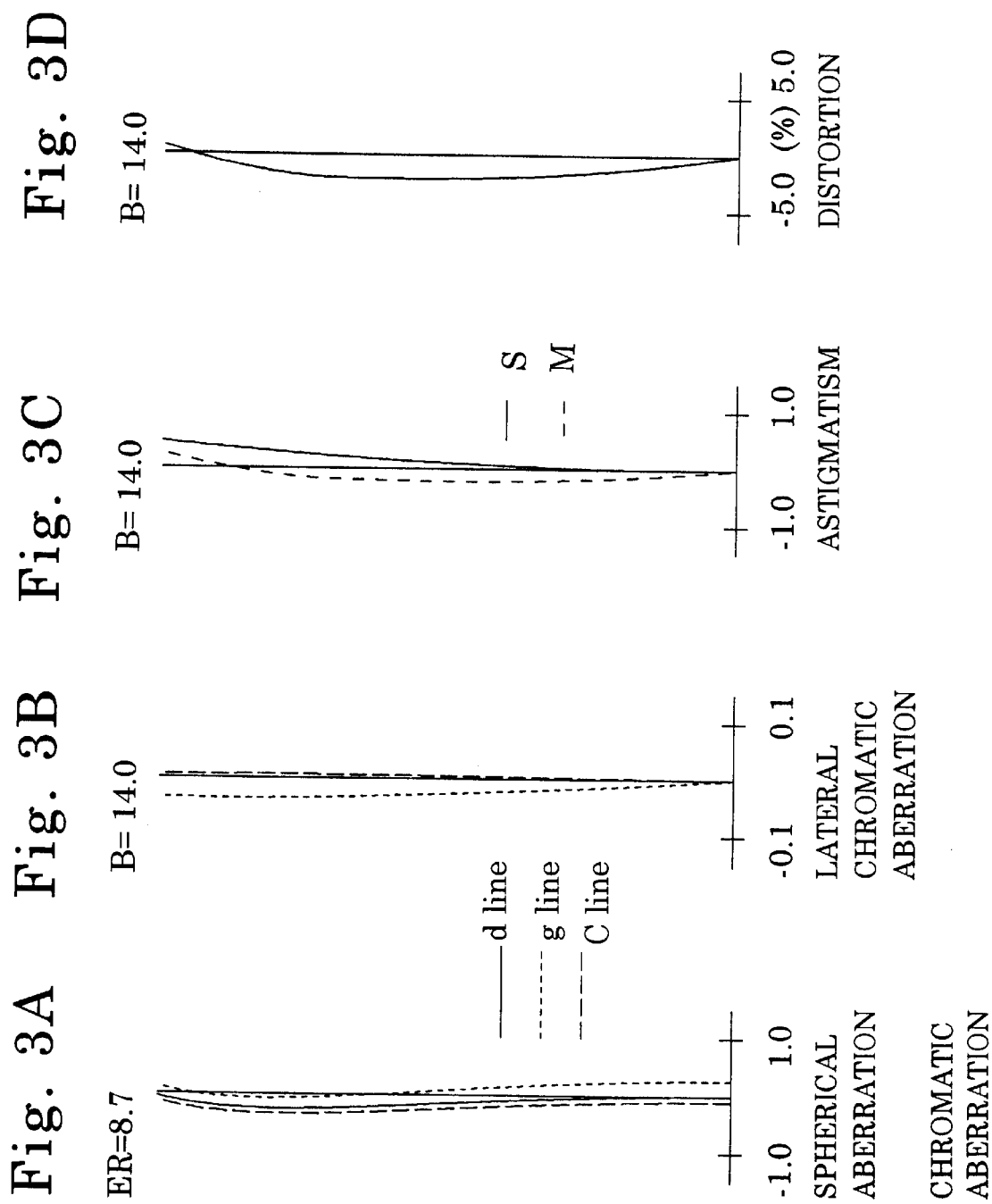

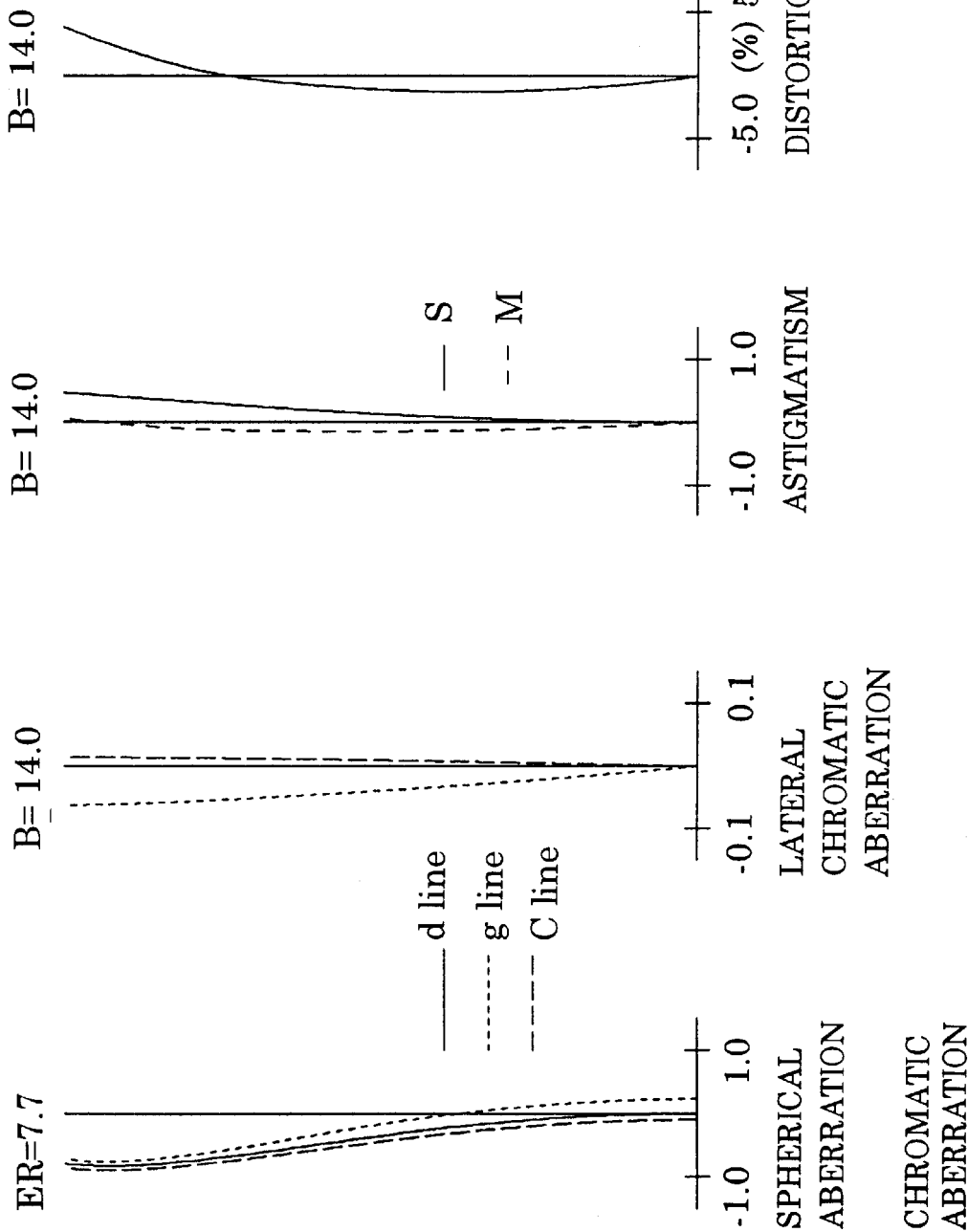

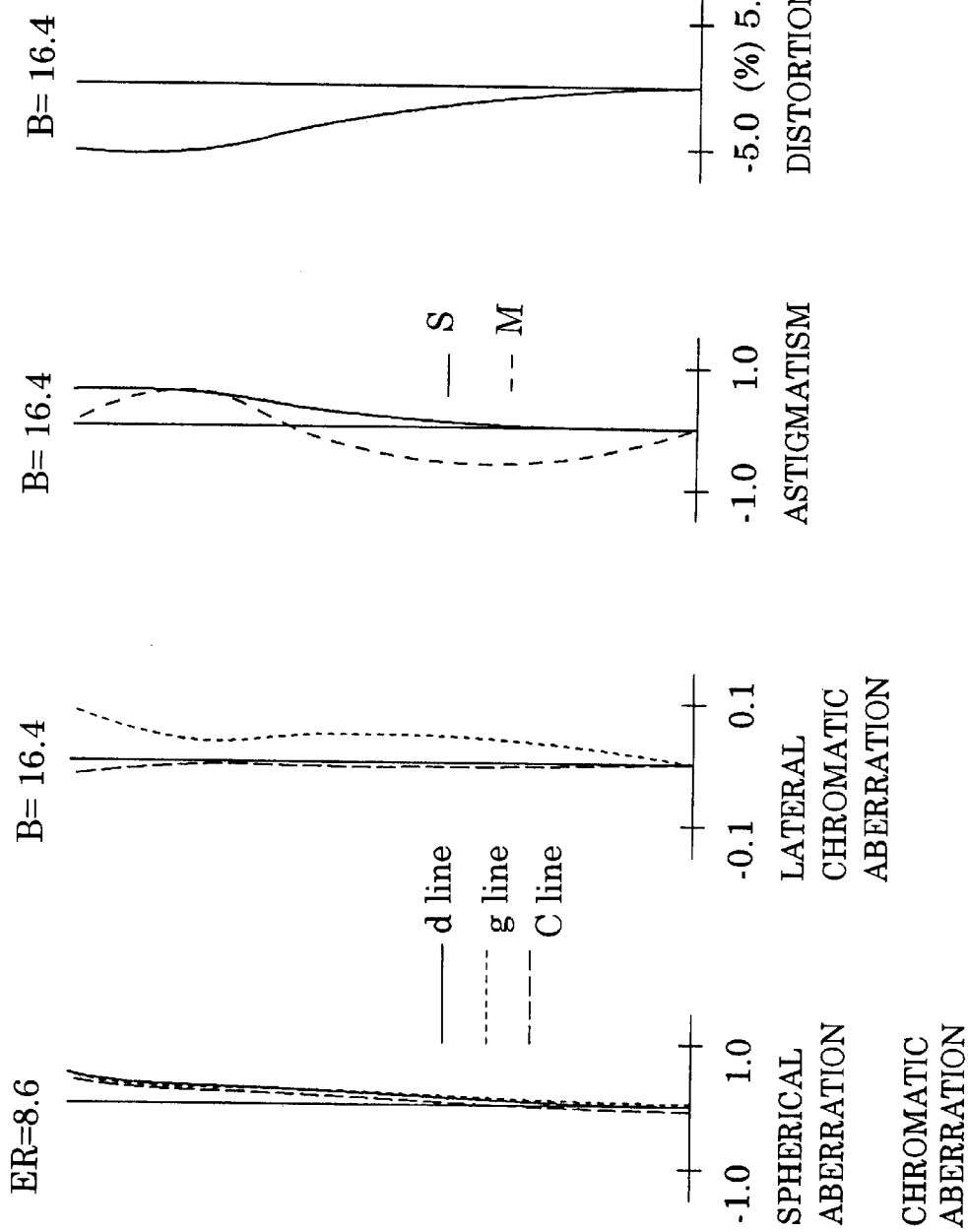

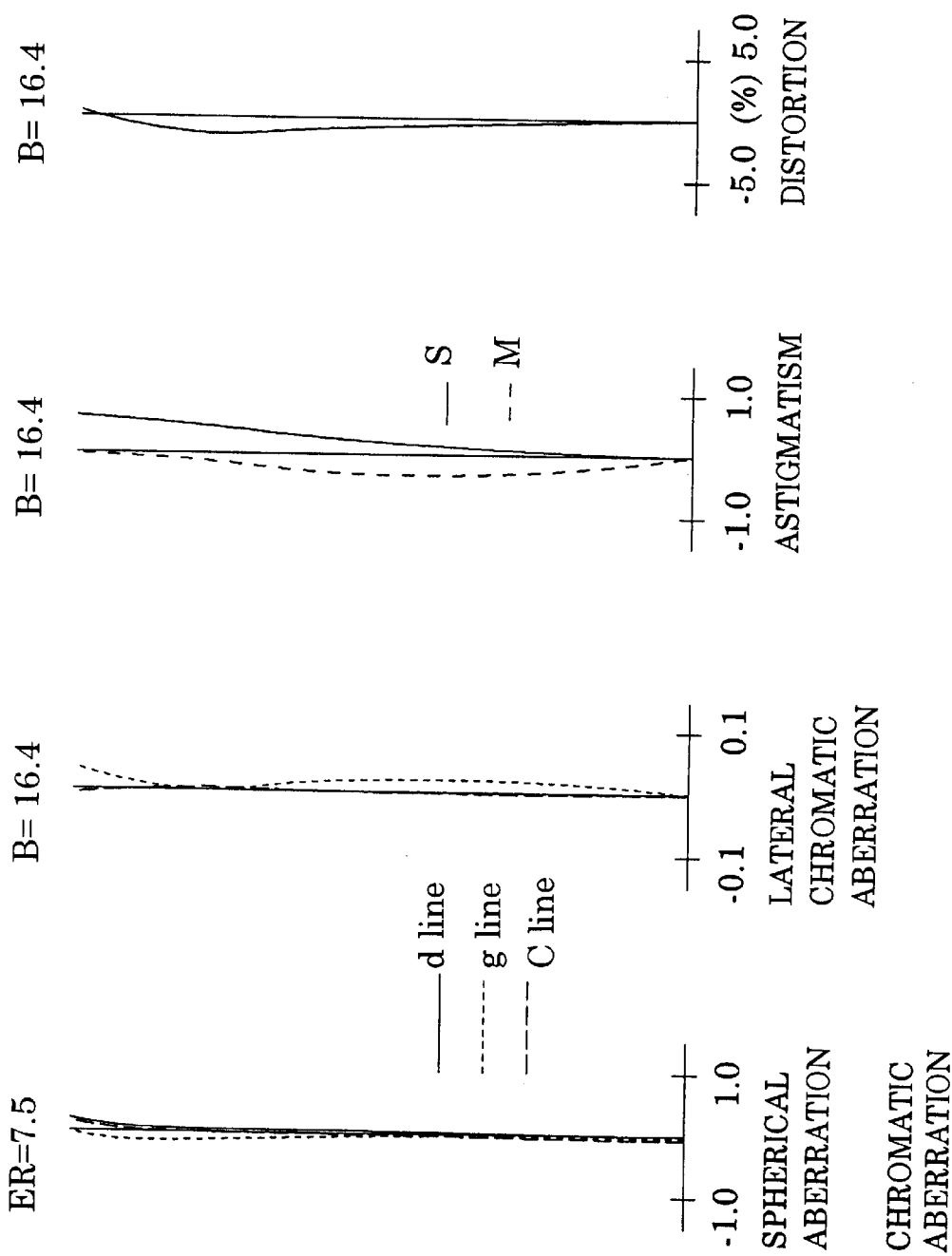

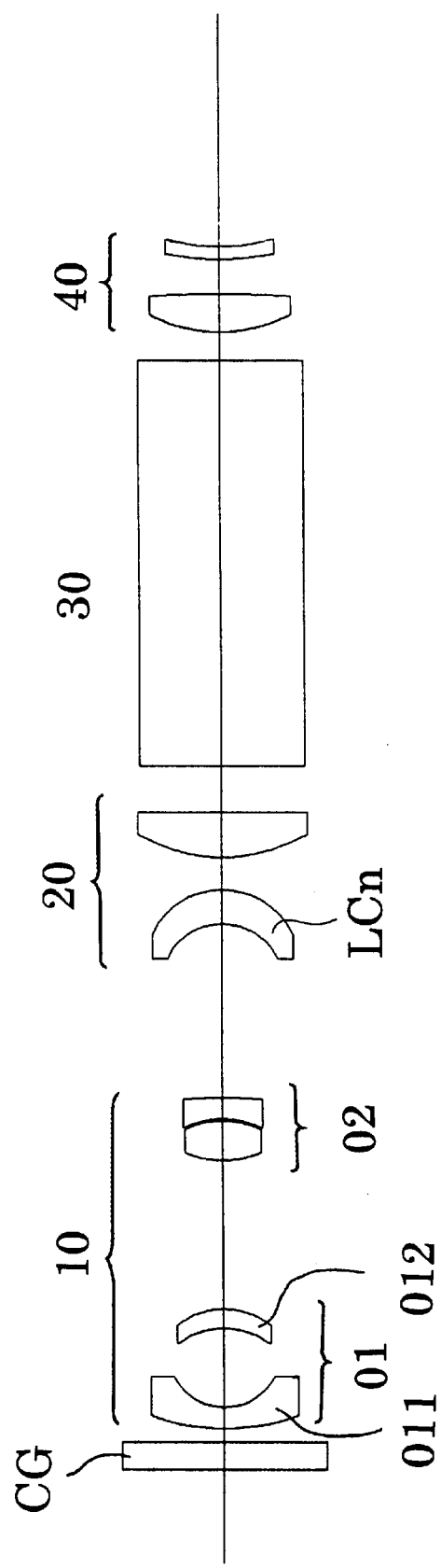

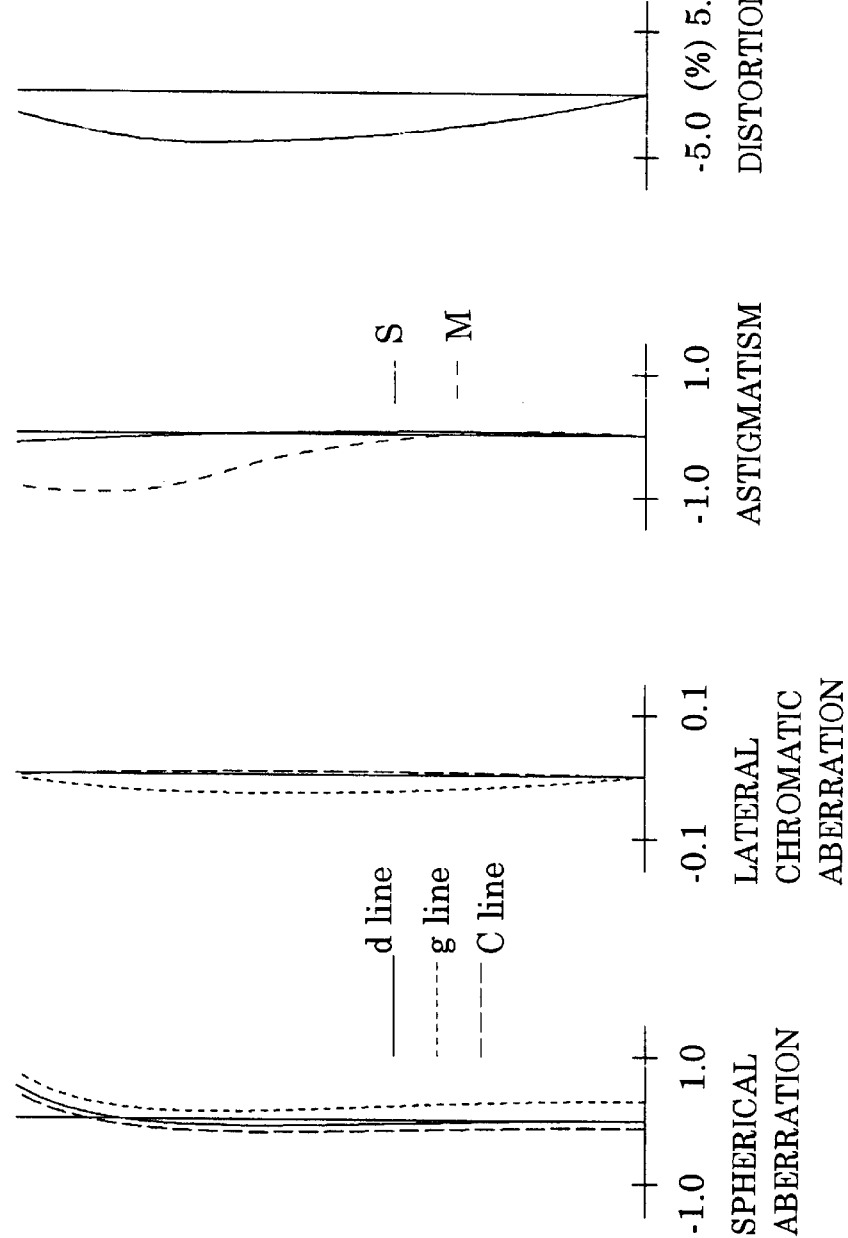

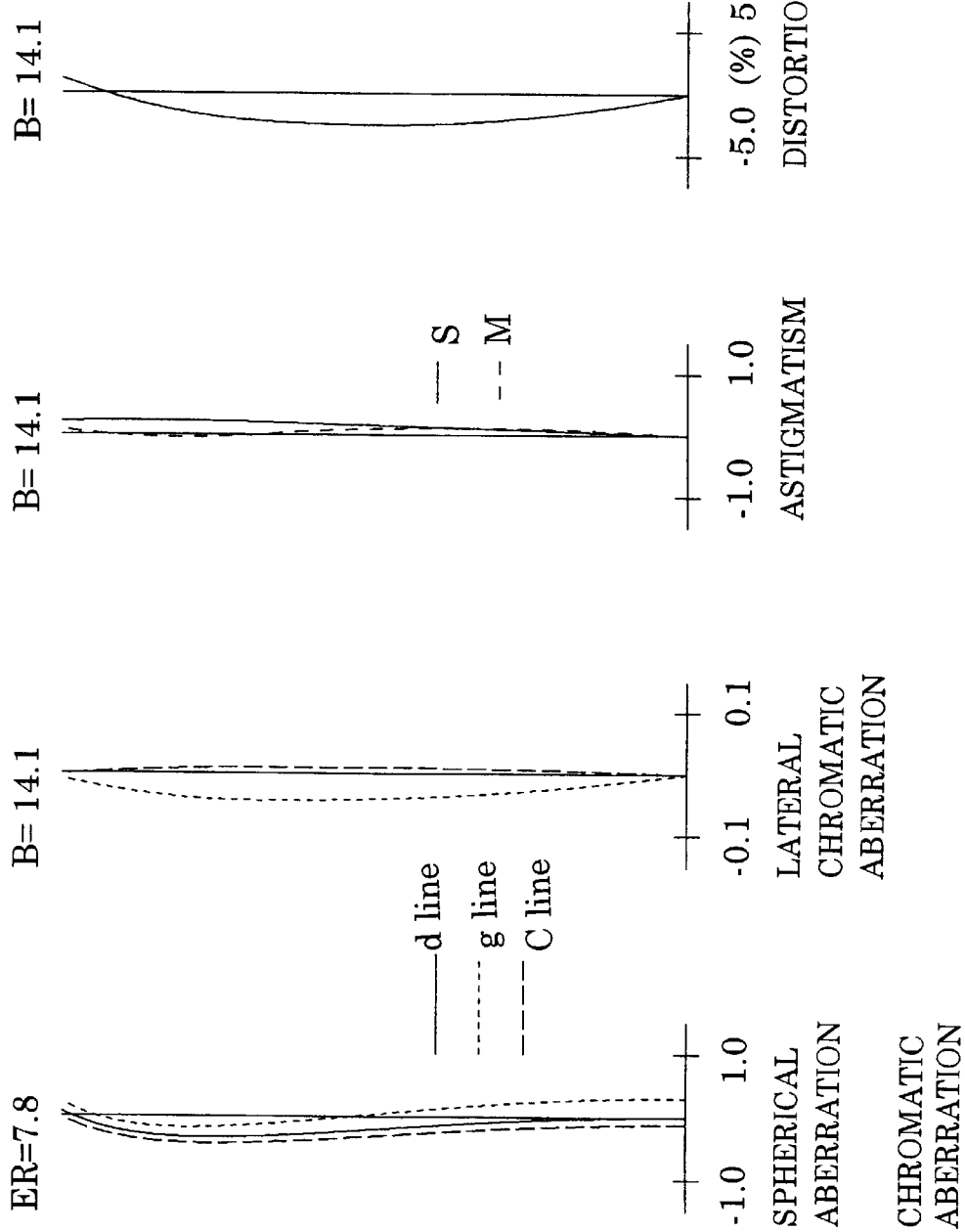

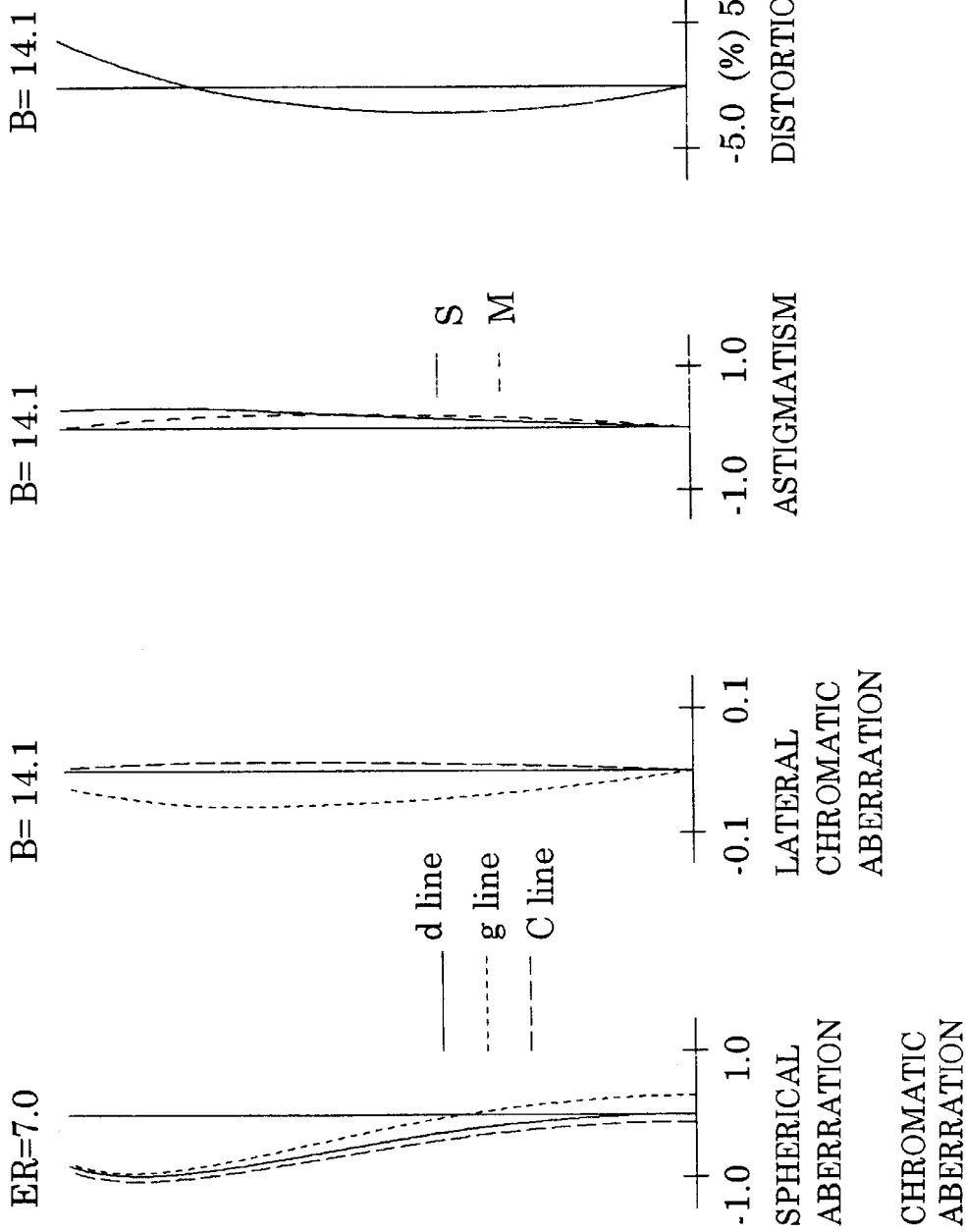

REAL-IMAGE ZOOM FINDER OPTICAL SYSTEM

BACKGROUND OF THE INVENTION

1. Field of the Invention

The present invention relates to a real-image zoom finder optical system.

2. Description of the Related Art

A real-image zoom finder optical system is provided with an objective lens system, an erecting optical system which erects an inverted image formed through the objective lens system, and an eyepiece lens system. In a wide-angle real-image zoom finder optical system of the prior art, the apparent visual angle is not sufficiently large, and the eyerelief is not sufficiently long. In other words, it is difficult for a conventional wide-angle real-image zoom finder optical system to suitably correct aberrations over the entire field-of-view while maintaining an enough apparent visual angle and a long eye relief.

SUMMARY OF THE INVENTION

It is an object of the present invention to provide a wide-angle real-image zoom finder optical system suitable for a still camera, a video camera and the like, and in particular, to provide a real-image zoom finder optical system having suitable performance, and having a wider apparent visual angle and a longer eyerelief.

In order to achieve the above-mentioned object, there is provided a real-image zoom finder optical system in which a condenser lens system is arranged to lead a bundle of rays carrying an object image formed by an objective lens system to an eyepiece lens system, and along the optical path from the objective lens system to the eyepiece lens system, an erecting optical system for erecting the image formed by the objective lens system is provided; and the objective lens system, the condenser lens system, the erecting optical system and the eyepiece lens system are arranged in this order from the object. The objective lens system includes a negative lens group O1 and a positive lens group O2, in this order from the object, and these lens groups are moveable along the optical axis upon zooming. Further, the negative lens group O1 includes a negative meniscus single lens element O11 having a convex surface facing towards the object, and a meniscus single lens element O12 having a convex surface facing towards the image, in this order from the object.

The real-image zoom finder optical system according to the present invention preferably satisfies the following condition:

$$SF1 < -1.1 \tag{1}$$

wherein
SF1=(r2+r1)/(r2−r1);
SF1 designates the shaping factor of the negative meniscus single lens element O11;
r1 designates the radius of curvature of the object-side surface of the negative meniscus single lens element O11; and
r2 designates the radius of curvature of the image-side surface of the negative meniscus single lens element O11.

As understood from condition (1), a feature of the present invention resides in the surface configuration of the most object-side negative meniscus single lens element in the real-image zoom finder optical system in which the objective lens system includes a negative lens group and a positive lens group, in this order from the object.

The real-image zoom finder optical system according to the present invention preferably satisfies the following condition:

$$-0.2 < \emptyset O12/\emptyset OC < 0.1 \tag{2}$$

wherein
$\emptyset O12$ designates the power of the meniscus single lens element O12; and
$\emptyset OC$ designates the resultant power of the objective lens system and the condenser lens system at the short focal length extremity.

The real-image zoom finder optical system according to the present invention preferably satisfies the following condition:

$$-3.5 < r4 \times \emptyset OC < -0.4 \tag{3}$$

wherein
r4 designates the radius of curvature of the image-side surface of the meniscus single lens element O12.

The condenser lens system preferably includes at least one positive lens element and a negative single lens element LCn having a concave surface facing towards the object. According to this arrangement, the apparent visual angle can be made larger, and the eyerelief can be made longer.

The negative single lens element LCn of the condenser lens system preferably satisfies the following condition:

$$1 \leq SFCn \tag{4}$$

wherein
SFCn=(r2'+r1')/(r2'−r1')
SFCn designates the shaping factor of the negative single lens element LCn;
r1' designates the radius of curvature of the object-side surface of the negative single lens element LCn; and
r2' designates the radius of curvature of the image-side surface of the negative single lens element LCn.

Furthermore, the negative single lens element LCn of the condenser lens system preferably satisfies the following condition:

$$-0.5 < \emptyset LCn/\emptyset OC < 0 \tag{5}$$

wherein
$\emptyset LCn$ designates the power of the negative single lens element LCn.
$\emptyset OC$ designates the resultant power of the objective lens system and the condenser lens system at the short focal length extremity.

BRIEF DESCRIPTION OF THE DRAWINGS

The invention will be discussed below in detail with reference to the accompanying drawings, in which:

FIG. 1 is a lens arrangement, at the short focal length extremity, of the first embodiment of a real-image zoom finder optical system according to present invention;

FIGS. 3A, 3B, 3C and 3D are aberration diagrams, at an intermediate focal length, of the lens arrangement of FIG. 1;

FIGS. 4A, 4B, 4C and 4D are aberration diagrams, at the long focal length extremity, of the lens arrangement of FIG. 1;

FIGS. 6A, 6B, 6C and 6D are aberration diagrams, at the short focal length extremity, of the lens arrangement of FIG. 5;

FIGS. 7A, 7B, 7C and 7D are aberration diagrams, at an intermediate focal length of the lens arrangement of FIG. 5;

FIG. 9 is a lens arrangement, at the short focal length extremity, of the third embodiment of a real-image zoom finder optical system according to present invention;

FIGS. 10A, 10B, 10C and 10D are aberration diagrams, at the short focal length extremity, of the lens arrangement of FIG. 9;

FIGS. 11A, 11B, 11C and 11D are aberration diagrams, at an intermediate focal length, of the lens arrangement of FIG. 9; and FIGS. 12A, 12B, 12C and 12D are aberration diagrams, at the long focal length extremity, of the lens arrangement of FIG. 9.

DESCRIPTION OF THE PREFERRED EMBODIMENTS

Figures 2A, 2B, 2C, 2D:
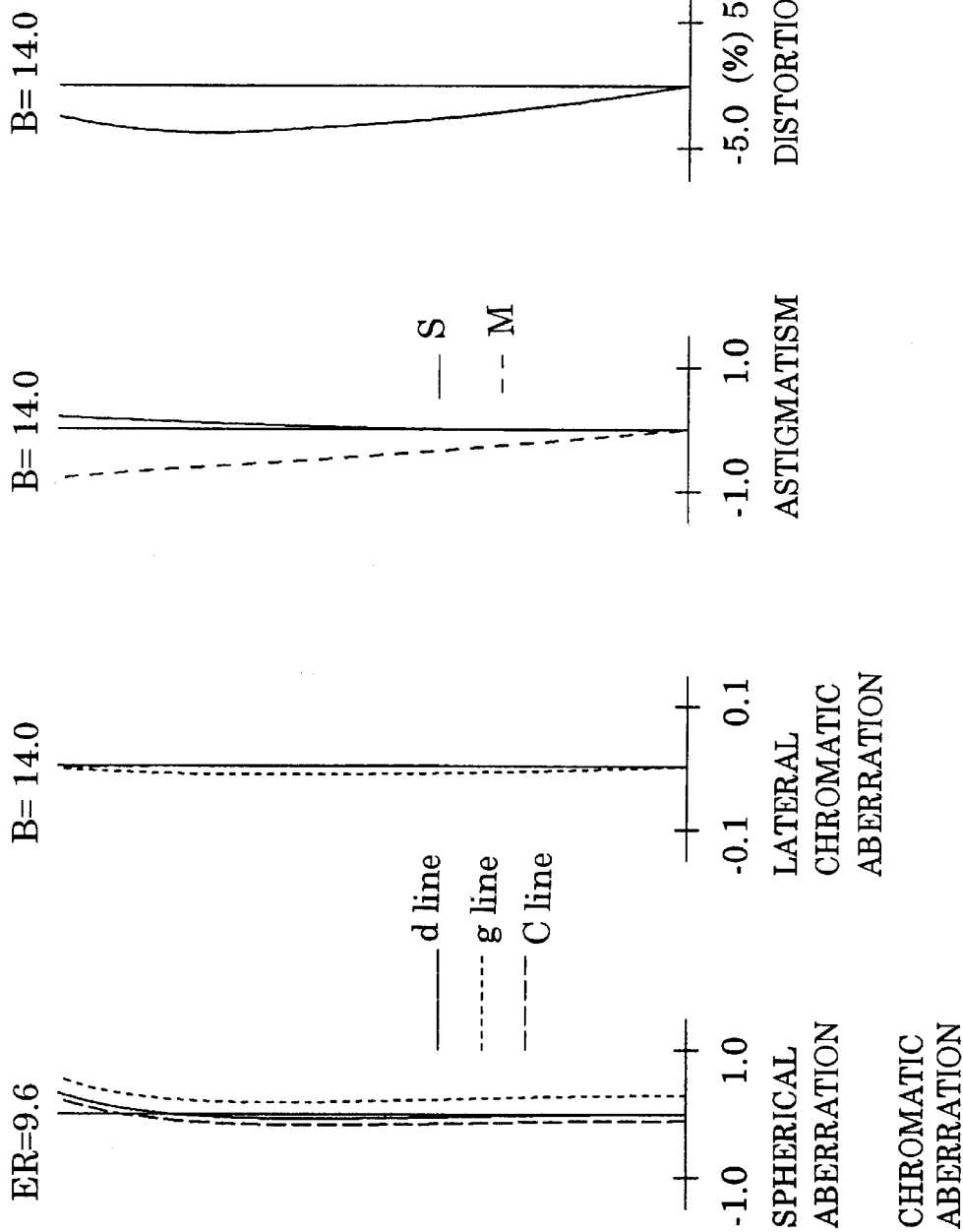
FIGS. 2A, 2B, 2C and 2D are aberration diagrams, at the short focal length extremity, of the lens arrangement of FIG. 1.
Figure 5:
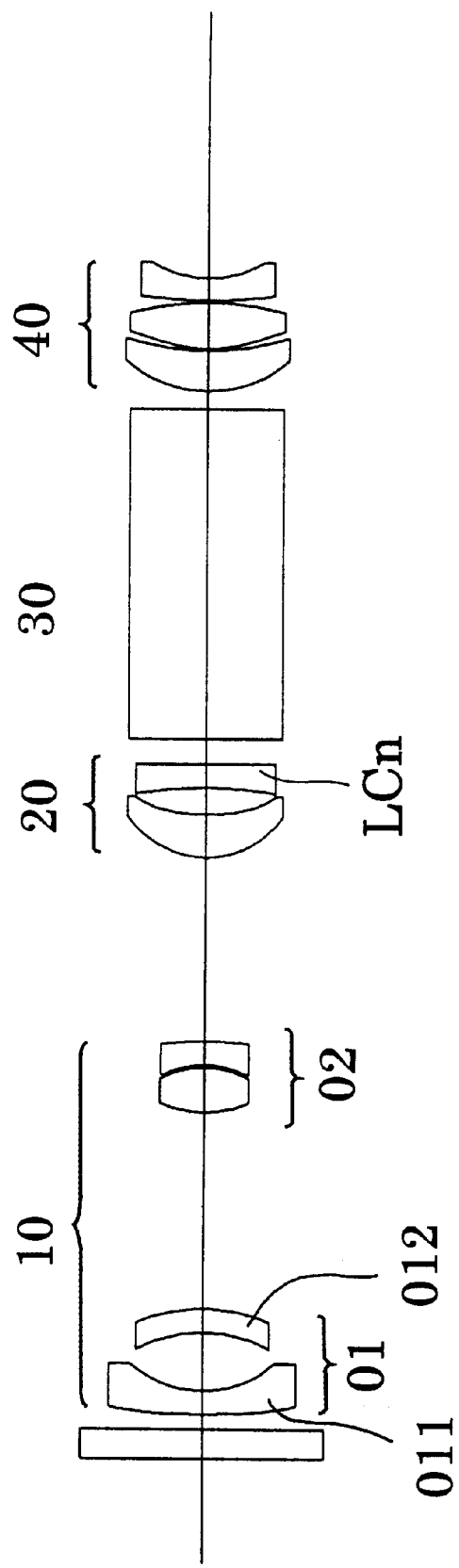
FIG. 5 is a lens arrangement, at the short focal length extremity, of the second embodiment of a real-image zoom finder optical system according to present invention.
Figures 8A, 8B, 8C, 8D:
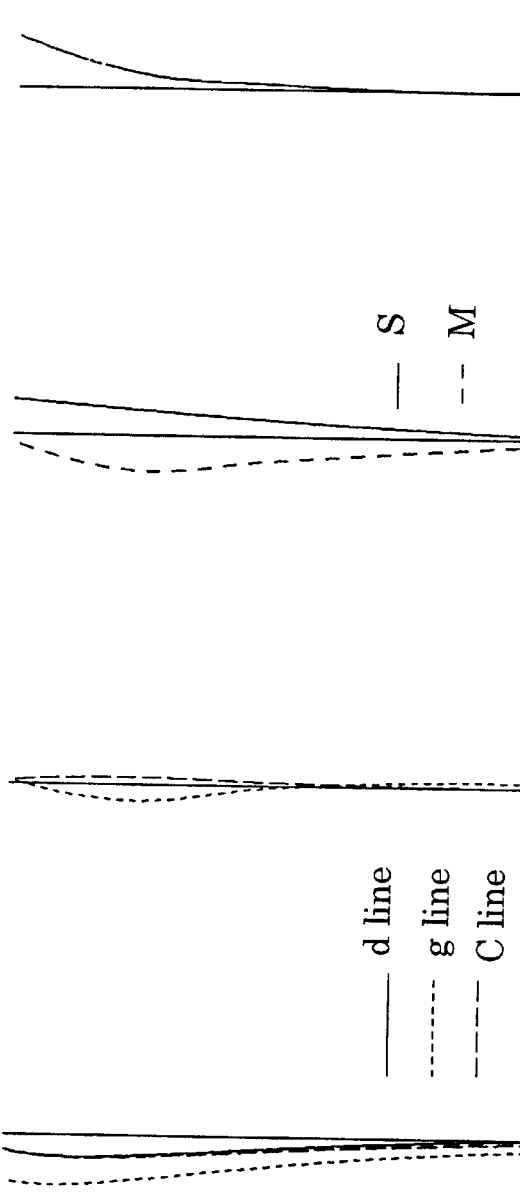
FIGS. 8A, 8B, 8C and 8D are aberration diagrams, at the long focal length extremity, of the lens arrangement of FIG. 5.

According to each embodiment as respectively shown in FIGS. 1, 5 and 9, in the real-image zoom finder optical system, a condenser lens system 20 is arranged to lead a bundle of rays carrying an object image formed by an objective lens system 10 to an eyepiece lens system 40, and along the optical path from the objective lens system 10 to the eyepiece lens system 40, an erecting optical system 30 for erecting the image formed by the objective lens system 10 is provided; and the objective lens system 10, the condenser lens system 20, the erecting optical system 30 and the eyepiece lens system 40 are arranged in this order from the object. The objective lens system 10 includes a negative lens group O1 and a positive lens group O2, in this order from the object, and these lens groups are moveable along the optical axis upon zooming. Further, the negative lens group O1 includes a negative meniscus single lens element O11 having a convex surface facing towards the object, and a meniscus single lens element O12 having a convex surface facing towards the image, in this order from the object. The meniscus single lens element O12 can either have positive or negative power. The erecting optical system 30 is constituted by, for example, four reflection surfaces, and these four reflection surfaces may be positioned along the optical path from the objective lens system 10 to the eyepiece lens system 40.

It is known in the art that in regard to a wide-angle real-image zoom finder optical system having a zoom ratio of 3 or less, a two-lens-group arrangement in which each of two lens groups is moveable upon zooming is suitable for an objective lens system. Similar to this known arrangement, the objective lens system 10 as a zooming lens group includes the negative lens group O1 and the positive lens group O2, in this order from the object. The negative lens group O1 includes the negative meniscus single lens element O11 having the convex surface facing towards the object, and the meniscus single lens element O12 having the convex surface facing towards the image, in this order from the object. In regard to the negative meniscus single lens element O11, due to the convex surface facing towards the object, an incident angle at an incident point on the convex surface is made smaller with respect to off-axis rays having a large angle of view, and refraction is evenly distributed over the first and second surfaces, so that occurrences of aberrations are reduced. Further, in regard to the meniscus single lens element O12, on the image-side thereof, an on-axis ray passes at the highest point from the optical axis due to the negative meniscus single lens element O11 and the negative power of the object-side surface of the meniscus single lens element O12. Therefore by forming the image-side of the meniscus single lens element O12 as a convex surface to generate negative spherical aberration, positive spherical aberration which is usually occurred in a negative lens group can be corrected. In the case of an image-forming optical system, in order to correct spherical aberration and chromatic aberration, a positive lens element is generally provided on the image-side in a negative lens group, such as the negative lens group O1, of a two-lens-group zoom lens system; however, in a finder optical system, since longitudinal chromatic aberration is not critical, so that the image-side surface of the meniscus single lens element O12 can be made convex in order to function as a positive lens element, and, the entire lens group O1 can be constituted by two lens elements.

Condition (1) specifies the configuration of the negative meniscus single lens element O11.

If the shaping factor becomes larger to the extent that SF1 exceeds the upper limit of condition (1), an incident angle of an off-axis rays with respect to the object-side surface of the negative meniscus single lens element O11 becomes larger, as a result, negative distortion and coma are largely occurred.

Condition (2) specifies the power of the meniscus single lens element O12.

If the negative power of the meniscus single lens element O12 becomes stronger to the extent that $\emptyset O12/\emptyset OC$ exceeds the lower limit of condition (2), negative distortion occurred in the negative lens group O1 becomes too large. Further, spherical aberration is overcorrected.

If the positive power of the meniscus single lens element O12 becomes stronger to the extent that $O\emptyset12/\emptyset OC$ exceeds the upper limit of condition (2), since the negative lens group O1 as a whole maintains negative power for zooming, the negative power of the negative meniscus single lens element O11 becomes too strong. Consequently, spherical aberration of higher order and astigmatism are occurred.

Condition (3) specifies the radius of curvature of the meniscus single lens element O12. According to this condition, the positive power of the image-side surface of the meniscus single lens element O12 is substantially determined.

If the radius of curvature of the image-side surface becomes smaller to the extent that $r4 \times \emptyset OC$ exceeds the lower limit of condition (3), the positive power becomes so strong that spherical aberration is undercorrected.

If the radius of curvature of the image-side surface becomes larger to the extent that $r4 \times \emptyset OC$ exceeds the upper limit of condition (3), the positive power becomes weaker, and the correcting of spherical aberration is insufficient. Spherical aberration is consequently overcorrected.

The condenser lens system is arranged to optically connect the objective lens system and the eyepiece lens system;

however, in order to make the apparent visual angle larger, the size of an image formed by the objective lens system has to be enlarged. On the other hand, if an attempt is made to enlarge an image by constituting a larger objective lens system, the size of the finder optical system as a whole becomes inevitably larger. As a countermeasure, a negative single lens element LCn having a concave surface facing towards the object is provided in the condenser lens system which is positioned on the side of an image with respect to the objective lens system, and thereby an image formed by the objective lens system can be enlarged since a bundle of rays emitted from the negative single lens element LCn is deflected in a direction away from the optical axis. As a result, the apparent visual angle can be made larger. Conditions (4) and (5) concern the negative single lens element LCn.

Condition (4) specifies the configuration of the negative single lens element LCn. According to this condition, the negative single lens element LCn is specified to be a meniscus lens element having a concave surface facing towards the object, or a planoconcave lens element having a concave surface facing towards the object. If the negative single lens element LCn is formed as a biconcave lens element, a bundle of rays is sharply deflected, so that the negative single lens element LCn does not function as a condenser lens element. On the other hand, if the image-side surface is made concave, the angle of refraction of an off-axis bundle of rays becomes larger, and thereby astigmatism is occurred.

Condition (5) specifies the power of the negative single lens element LCn. By satisfying this condition, occurrences of other aberrations are reduced, and the negative single lens element LCn can function as a field flattener, so that field of curvature can be corrected.

If the negative power becomes stronger to the extent that ØLCn/ØOC exceeds the lower limit of condition (5), since the condenser lens group as a whole has the positive power, the power of each lens group becomes extremely stronger, and as a result, aberrations are largely occurred.

If the positive power becomes stronger to the extent that ØLCn/ØOC exceeds the upper limit of condition (5), the negative single lens element LCn cannot function to enlarge the image.

Specific numerical data of the embodiments will be described hereinafter. In the tables and diagrams, D designates the diopter ($m^{-1}$), R designates the radius of curvature of each lens surface, d designates the lens thickness or the distance between the lens elements, $N_d$ designates the refractive index of the d-line, and v designates the Abbe number. In the diagrams of chromatic aberration represented by spherical aberration, the solid lines and the two types of dotted lines respectively indicate spherical aberrations with respect to the d, g and C lines. Also, the diagrams of lateral chromatic aberration respecively show a deviation of an angle of the g and C lines from the d line which is considered as the reference line. S designates the sagittal image, and M designates the meridional image. Furthermore, in the aberration diagrams, ER designates the diameter of the exit pupil (mm), and B designates the exit angle (°).

In addition to the above, an aspherical surface which is rotationally symmetrical with respect to the optical axis is defined as follows:

$$x=Ch^2/\{1+[1-(1+K)C^2h^2]^{1/2}\}+A4h^4+A6h^6+A8h^8+A10h^{10};$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

FIGS. 1 through 4 show the first embodiment of the real-image zoom finder optical system according to the present invention. FIG. 1 is a lens arrangement, at the short focal length extremity, and Table 1 shows the numerical data thereof. The objective lens system 10 includes the negative lens group O1 having the negative meniscus single lens element O11 and the negative meniscus single lens element O12, and the positive lens group O2 having a positive lens element and a negative lens element, in this order from the object. The condenser lens system 20 includes the negative meniscus lens element LCn, a positive lens element, and a positive lens element, in this order from the object. The eyepiece lens system 40 includes a positive lens element and a negative meniscus lens element, in this order from the object. A cover-glass (plane-parallel plate) CG is provided in front of the objective lens system 10. From the short focal length extremity over the long focal length extremity, zooming is performed by moving the negative lens group O1 towards the image, and after, towards the object, and by monotonously moving the positive lens group O2 towards the object. FIGS. 2A through 2D are aberration diagrams, at the short focal length extremity, of the lens arrangement of FIG. 1. FIGS. 3A through 3D are aberration diagrams, at an intermediate focal length, of the lens arrangement of FIG. 1. FIGS. 4A through 4D are aberration diagrams, at the long focal length extremity, of the lens arrangement of FIG. 1.

TABLE 1

D = -1.00~-1.00~-1.00
Apparent Visual Angle (β) = -14.0°~-14.0°~-14.0°
Eye Relief = 14.9—14.9—14.9
Real Field of view (2ω) = 34.3°–27.6°–22.1°

| Surface No. | R | d | Nd | v |
|---|---|---|---|---|
| 1 | ∞ | 2.85 | 1.49176 | 57.4 |
| 2 | ∞ | 1.50–3.28–3.00 | — | — |
| 3 | 36.742 | 2.25 | 1.49176 | 57.4 |
| 4 | 7.409 | 8.04 | — | — |
| 5 | -11.285 | 2.20 | 1.49176 | 57.4 |
| 6 | -11.776 | 13.01–7.55–3.00 | — | — |
| 7 | 13.559 | 4.30 | 1.49176 | 57.4 |
| 8 | -9.171 | 0.20 | — | — |
| 9 | -9.468 | 2.25 | 1.58547 | 29.9 |
| 10* | -24.562 | 19.65–23.32–28.16 | — | — |
| 11* | -9.593 | 2.00 | 1.58547 | 29.9 |
| 12 | -14.620 | 0.20 | — | — |
| 13* | 16.609 | 5.00 | 1.49176 | 57.4 |
| 14* | -115.668 | 4.85 | — | — |
| 15 | 40.673 | 3.00 | 1.49176 | 57.4 |
| 16 | ∞ | 5.00 | — | — |
| 17 | ∞ | 45.28 | 1.49176 | 57.4 |
| 18 | ∞ | 3.25 | — | — |
| 19* | 17.337 | 4.16 | 1.49176 | 57.4 |
| 20 | -70.428 | 3.91 | — | — |
| 21 | 27.147 | 1.40 | 1.58547 | 29.9 |
| 22 | 17.615 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 |
| --- | --- | --- | --- |
| 3 | 0.00 | $0.6551 \times 10^{-4}$ | — |
| 10 | 0.00 | $0.1083 \times 10^{-3}$ | — |
| 11 | 0.00 | $0.1097 \times 10^{-3}$ | — |
| 13 | 0.00 | $-0.3568 \times 10^{-4}$ | — |
| 14 | 0.00 | $0.3480 \times 10^{-4}$ | — |
| 19 | 0.00 | $-0.3750 \times 10^{-4}$ | $0.6122 \times 10^{-7}$ |

Embodiment 2

FIGS. 5 through 8 show the second embodiment of the real-image zoom finder optical system according to the present invention. FIG. 5 is a lens arrangement, at the short focal length extremity, and Table 2 shows the numerical data thereof. The objective lens system 10 includes the negative lens group O1 having the negative meniscus single lens element O11 and the negative meniscus single lens element O12, and the positive lens group O2 having a positive lens element and a negative lens element, in this order from the object. The condenser lens system 20 includes a positive meniscus lens element and a negative lens element LCn, in this order from the object. The eyepiece lens system 40 includes a positive meniscus lens element, a positive lens element and a negative meniscus lens element, in this order from the object. A cover-glass (plane-parallel plate) CG is provided in front of the objective lens system 10. From the short focal length extremity over the long focal length extremity, zooming is performed by monotonously moving the negative lens group O1 towards the image, and by monotonously moving the positive lens group O2 towards the object. FIGS. 6A through 6D are aberration diagrams, at the short focal length extremity, of the lens arrangement of FIG. 5. FIGS. 7A through 7D are aberration diagrams, at an intermediate focal length, of the lens arrangement of FIG. 5. FIGS. 8A through 8D are aberration diagrams, at the long focal length extremity, of the lens arrangement of FIG. 5.

TABLE 2

D = -1.01~-1.00~-1.01
Apparent Visual Angle ($\beta$) = 16.42°—16.42°—16.42°
Eye Relief = 15.5—15.5—15.5
Real Field of view (2$\omega$) = 34.9°–25.8°–20.3°

| Surface No. | R | d | Nd | $\nu$ |
| --- | --- | --- | --- | --- |
| 1 | ∞ | 2.85 | 1.49176 | 57.4 |
| 2 | ∞ | 1.50–4.86–4.92 | — | — |
| 3* | 95.324 | 2.25 | 1.49176 | 57.4 |
| 4* | 10.965 | 5.58 | — | — |
| 5 | -14.063 | 2.20 | 1.49176 | 57.4 |
| 6 | -17.810 | 18.92–10.99–6.42 | — | — |
| 7* | 11.440 | 4.30 | 1.49176 | 57.4 |
| 8 | -9.521 | 0.25 | — | — |
| 9 | -9.271 | 2.25 | 1.58547 | 29.9 |
| 10* | -27.623 | 17.92–22.49–27.01 | — | — |
| 11 | 9.053 | 4.36 | 1.49176 | 57.4 |
| 12* | 22.496 | 2.63 | — | — |
| 13 | -39.434 | 2.25 | 1.58547 | 29.9 |
| 14 | ∞ | 2.50 | — | — |
| 15 | ∞ | 32.55 | 1.49176 | 57.4 |
| 16 | ∞ | 1.80 | — | — |
| 17 | 12.311 | 3.87 | 1.49176 | 57.4 |
| 18 | 25.702 | 0.20 | — | — |
| 19* | 13.171 | 4.50 | 1.491.76 | 57.4 |
| 20 | -28.685 | 0.20 | — | — |
| 21 | 49.632 | 2.15 | 1.58547 | 29.9 |
| 22 | 10.634 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 |
| --- | --- | --- | --- |
| 3 | 0.00 | $0.4485 \times 10^{-4}$ | — |
| 4 | 0.00 | $0.1862 \times 10^{-4}$ | — |
| 7 | 0.00 | $0.5429 \times 10^{-4}$ | — |
| 10 | 0.00 | $0.1777 \times 10^{-3}$ | — |
| 12 | 0.00 | $0.2970 \times 10^{-3}$ | — |
| 19 | 0.00 | $-0.1628 \times 10^{-3}$ | $-0.8920 \times 10^{-6}$ |

Embodiment 3

FIGS. 9 through 12 show the third embodiment of the real-image zoom finder optical system according to the present invention. FIG. 9 is a lens arrangement, at the short focal length extremity, and Table 3 shows the numerical data thereof. The objective lens system 10 includes the negative lens group O1 having the negative meniscus single lens element O11 and the positive meniscus single lens element O12, and the positive lens group O2 having a positive lens element and a negative lens element, in this order from the object. The condenser lens system 20 includes the negative meniscus lens element LCn and a positive lens element, in this order from the object. The eyepiece lens system 40 includes a positive lens element and a negative meniscus lens element, in this order from the object. A cover-glass (plane-parallel plate) CG is provided in front of the objective lens system 10. From the short focal length extremity over the long focal length extremity, zooming is performed by monotonously moving the negative lens group O1 towards the image, and by monotonously moving the positive lens group O2 towards the object. FIGS. 10A through 10D are aberration diagrams, at the short focal length extremity, of the lens arrangement of FIG. 9. FIGS. 11A through 11D are aberration diagrams, at an intermediate focal length, of the lens arrangement of FIG. 9. FIGS. 12A through 12D are aberration diagrams, at the long focal length extremity, of the lens arrangement of FIG. 9.

TABLE 3

D = -1.00~-1.00~1.00
Apparent Visual Angle ($\beta$) = -14.1°~-14.1°~-14.1°
Eye Relief = 15.5—15.5—15.5
Real Field of view (2$\omega$) = 34.3°–27.8°–22.0°

| Surface No. | R | d | Nd | $\nu$ |
| --- | --- | --- | --- | --- |
| 1 | ∞ | 2.85 | 1.49176 | 57.4 |
| 2 | ∞ | 1.50–5.84–8.18 | — | — |
| 3* | 29.864 | 2.25 | 1.49176 | 57.4 |
| 4 | 6.175 | 8.53 | — | — |
| 5 | -7.850 | 2.20 | 1.49176 | 57.4 |
| 6 | -7.801 | 16.01–9.00–3.00 | — | — |
| 7 | 10.658 | 4.30 | 1.49176 | 57.4 |
| 8 | -9.278 | 0.20 | — | — |
| 9 | -9.525 | 2.25 | 1.58547 | 29.9 |
| 10* | -37.810 | 18.94–21.61–25.26 | — | — |
| 11* | -6.465 | 3.70 | 1.58547 | 29.9 |
| 12 | -8.446 | 3.60 | — | — |
| 13* | 16.196 | 5.00 | 1.49176 | 57.4 |
| 14 | ∞ | 5.00 | — | — |
| 15 | ∞ | 44.67 | 1.49176 | 57.4 |
| 16 | ∞ | 3.16 | — | — |
| 17* | 15.564 | 4.19 | 1.49176 | 57.4 |
| 18 | -117.319 | 3.76 | — | — |
| 19 | 30.902 | 1.40 | 1.58547 | 29.9 |
| 20 | 19.119 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 |
|---|---|---|---|
| 3 | 0.00 | $0.8206 \times 10^{-4}$ | — |
| 10 | 0.00 | $0.1951 \times 10^{-3}$ | — |
| 11 | 0.00 | $0.2833 \times 10^{-3}$ | $-0.4994 \times 10^{-5}$ |
| 13 | 0.00 | $-0.4570 \times 10^{-4}$ | — |
| 17 | 0.00 | $-0.4213 \times 10^{-4}$ | $0.4479 \times 10^{-7}$ |

Numerical values of each condition of each embodiment are shown in Table 4.

TABLE 4

|  | Embod. 1 | Embod. 2 | Embod. 3 |
|---|---|---|---|
| Cond. (1) | −1.505 | −1.260 | −1.521 |
| Cond. (2) | 0.0118 | −0.0608 | 0.0836 |
| Cond. (3) | −0.863 | −1.739 | −0.580 |
| Cond. (4) | 4.817 | 1.000 | 7.527 |
| Cond. (5) | −0.244 | −0.128 | −0.089 |

In each embodiment, each condition is satisfied, and aberrations are adequately corrected.

According to the present invention, a real-image zoom finder optical system having a suitable performance with the real field of view of about 34° can be obtained. Furthermore, a real-image zoom finder optical system having a wider apparent visual angle and a longer eyerelief can be obtained.

What is claimed is:

1. A real-image zoom finder optical system in which a condenser lens system leads a bundle of rays carrying an object image formed by an objective lens system to an eyepiece lens system, and along an optical path from said objective lens system to said eyepiece lens system, an erecting optical system erects said image formed by said objective lens system; and said objective lens system, said condenser lens system, said erecting optical system and said eyepiece lens system are arranged in this order from said object;

wherein said objective lens system comprises a negative lens group and a positive lens group, in this order from said object, and said negative and positive lens groups are movable along the optical axis upon zooming;

wherein said negative lens group comprises a negative meniscus single lens element having a convex surface facing towards said object, and a meniscus single lens element having a convex surface facing towards said image, in this order from said object; and wherein said condenser lens system comprises at least one positive lens element and a negative single lens element having a concave surface facing towards said object.

2. The real-image zoom finder optical system according to claim 1, wherein said real-image zoom finder optical system satisfies the following condition:

$$SF1 < -1.1$$

wherein
SF1=(r2+r1)/(r2−r1);
SF1 designates the shaping factor of said negative meniscus single lens element;

r1 designates the radius of curvature of the object-side surface of said negative meniscus single lens element; and r2 designates the radius of curvature of the image-side surface of said negative meniscus single lens element.

3. The real-image zoom finder optical system according to claim 1, wherein said real-image zoom finder optical system satisfies the following condition:

$$-0.2 < \varnothing O12/\varnothing OC < 0.1$$

wherein
$\varnothing O12$ designates the power of said meniscus single lens element; and
$\varnothing OC$ designates the resultant power of said objective lens system and said condenser lens system at a short focal length extremity.

4. The real-image zoom finder optical system according to claim 1, wherein said real-image zoom finder optical system satisfies the following condition:

$$-3.5 < r4 \times \varnothing OC < -0.4$$

wherein
r4 designates the radius of curvature of the image-side surface of said meniscus single lens element, and
$\varnothing OC$ designates the resultant power of said objective lens system and said condenser lens system at a short focal length extremity.

5. The real-image zoom finder optical system according to claim 1, wherein said negative single lens element of said condenser lens system satisfies the following condition:

$$1 \leq SFCn$$

wherein
SFCn=(r2'+r1')/(r2'−r1');
SFCn designates the shaping factor of said negative single lens element;
r1' designates the radius of curvature of the object-side surface of said negative single lens element; and
r2' designates the radius of curvature of the image-side surface of said negative single lens element.

6. The real-image zoom finder optical system according to claim 1, wherein said negative single lens element of said condenser lens system satisfies the following condition:

$$-0.5 < LCn/\varnothing OC < 0$$

wherein
$\varnothing LCn$ designates the power of said negative single lens element, and
$\varnothing OC$ designates the resultant power of said objective lens system and said condenser lens system at a short focal length extremity.

* * * * *